(12) United States Patent
Williams et al.

(10) Patent No.: US 9,177,399 B2
(45) Date of Patent: Nov. 3, 2015

(54) METHOD AND SYSTEM FOR PLOTTING A DISTRIBUTION OF DATA

(71) Applicant: General Electric Company, Schenectady, NY (US)

(72) Inventors: Scott Terrell Williams, Minden, NV (US); Ken Paul Ceglia, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 13/707,882

(22) Filed: Dec. 7, 2012

(65) Prior Publication Data

US 2014/0160130 A1    Jun. 12, 2014

(51) Int. Cl.
| | |
|---|---|
| G06T 11/20 | (2006.01) |
| G09G 5/22 | (2006.01) |
| G01B 3/00 | (2006.01) |
| G01R 15/00 | (2006.01) |
| G01R 13/00 | (2006.01) |
| G01R 13/02 | (2006.01) |
| G06F 3/048 | (2013.01) |

(52) U.S. Cl.
CPC .................................. *G06T 11/206* (2013.01)

(58) Field of Classification Search
CPC .............................. G06T 11/206; G01R 13/345
USPC .......... 345/440, 440.1, 440.2; 701/29.1, 32.1, 701/33.7–34.1, 34.3; 702/33–35, 57, 58, 702/66–78, 127, 179–186; 700/28, 32, 33, 700/108–110; 715/764, 765
See application file for complete search history.

(56) References Cited

U.S. PATENT DOCUMENTS

| | | | |
|---|---|---|---|
| 5,029,110 | A | 7/1991 | Purchase et al. |
| 6,477,485 | B1 | 11/2002 | Radulovic et al. |
| 6,753,944 | B1 | 6/2004 | Dajnowicz |
| 7,010,461 | B2 | 3/2006 | Draxton et al. |
| 7,277,777 | B2 | 10/2007 | Draxton et al. |
| 7,756,657 | B2 | 7/2010 | Davidson et al. |
| 8,089,390 | B2 | 1/2012 | Jones et al. |
| 8,170,800 | B2 | 5/2012 | Aamodt et al. |
| 2005/0149264 | A1 | 7/2005 | Tarvin et al. |
| 2007/0005296 | A1* | 1/2007 | Beresniewicz et al. ....... 702/181 |
| 2007/0176933 | A1* | 8/2007 | Culpi et al. ................ 345/440.2 |
| 2007/0219758 | A1 | 9/2007 | Bloomfield |
| 2008/0079723 | A1 | 4/2008 | Hanson et al. |
| 2009/0173494 | A1 | 7/2009 | Tarvin et al. |
| 2010/0278086 | A1 | 11/2010 | Pochiraju et al. |
| 2012/0068658 | A1* | 3/2012 | Jalluri et al. .................. 318/561 |
| 2012/0221589 | A1* | 8/2012 | Shahar et al. ................. 707/758 |

* cited by examiner

*Primary Examiner* — Ke Xiao
*Assistant Examiner* — Andrew Shin
(74) *Attorney, Agent, or Firm* — Fletcher Yoder, P.C.

(57) ABSTRACT

In one aspect, a method for displaying measurement information from at least one sensor of a machine is provided. In another aspect, a computing device for displaying measurement information from at least one sensor of a machine is provided. In another aspect, a system for displaying measurement information from at least one sensor of a machine is provided.

20 Claims, 7 Drawing Sheets

US 9,177,399 B2

METHOD AND SYSTEM FOR PLOTTING A DISTRIBUTION OF DATA

BACKGROUND OF THE INVENTION

The field of the invention relates generally to displaying information, and more particularly to methods and systems for use in plotting data in a format that graphically shows information about the distribution of the data.

In a facility in which resources are received, processed, and converted by machines into electricity or another product, it is often beneficial to monitor the status of the machines to determine whether they are operating normally. To facilitate such monitoring, in at least some facilities, sensors are positioned adjacent to such machines to measure one or more parameters or characteristics, such as vibrations, temperatures, voltages, or currents associated with the machines. In some environments with multiple machines and multiple sensors, information collected by the sensors is transmitted to a central computer for evaluation by the computer and/or a user of the computer. Additionally, the information may be stored in a database and reviewed on an as-needed basis.

Data stored as described above may relate to a particular type of measurement for a particular machine, over a specified time period. The information may be presented to a user as a plot of the data over the time period. However, the plot does not graphically show how data pertaining to a particular type of measurement for a particular machine is distributed over repetitions of the time period.

BRIEF DESCRIPTION OF THE INVENTION

In one aspect, a method for displaying measurement information from at least one sensor of a machine is provided. The method is implemented by a computing device. The method includes storing, in a memory coupled to the computing device, a data set based on measurement information from at least one sensor. The data set has a first dimension and a second dimension, and a plurality of data points. Each data point has a first value associated with the first dimension and a second value associated with the second dimension. The first dimension is divided into multiple subunits. The data set contains multiple data points for each subunit. Each subunit includes a minimum value, a maximum value, a distribution, a mode, and a mean based on the associated data points. The method further includes displaying, with a display device, a plot of the data set. The plot includes a first axis corresponding with the first dimension of the data set and a second axis, perpendicular to the first axis, corresponding with the second dimension of the data set. The plot additionally includes a plurality of adjacent gradients. Each gradient has a length that is parallel to the second axis. Each gradient corresponds with a different one of the subunits and visually represents the minimum value and the maximum value.

In another aspect, a computing device for displaying measurement information from at least one sensor of a machine is provided. The computing device includes a processor, a memory coupled to the processor, and a display device coupled to the processor. The memory contains processor-executable instructions for performing steps. One step is storing, in the memory, a data set based on measurement information from the at least one sensor. The data set has a first dimension and a second dimension and a plurality of data points. Each data point has a first value associated with the first dimension and a second value associated with the second dimension. The first dimension is divided into multiple subunits. The data set contains multiple data points for each subunit. Each subunit includes a minimum value, a maximum value, a distribution, a mode, and a mean based on the associated data points. Another step is displaying, with the display device, a plot of the data set. The plot includes a first axis corresponding with the first dimension of the data set and a second axis, perpendicular to the first axis, corresponding with the second dimension of the data set. The plot also includes a plurality of adjacent gradients. Each gradient has a length that is parallel to the second axis. Each gradient corresponds with a different one of the subunits and visually represents the minimum value and the maximum value.

In another aspect, a system for displaying measurement information from at least one sensor of a machine is provided. The system includes the machine, at least one sensor, a computing device including a processor, a memory coupled to the processor, and a display device coupled to the processor. The memory contains processor-executable instructions for performing steps. One step is storing, in the memory, a data set based on measurement information from the at least one sensor. The data set has a first dimension and a second dimension and a plurality of data points. Each data point has a first value associated with the first dimension and a second value associated with the second dimension. The first dimension is divided into multiple subunits. The data set contains multiple data points for each subunit. Each subunit includes a minimum value, a maximum value, a distribution, a mode, and a mean based on the associated data points. Another step is displaying, with the display device, a plot of the data set. The plot includes a first axis corresponding with the first dimension of the data set and a second axis, perpendicular to the first axis, corresponding with the second dimension of the data set. The plot also includes a plurality of adjacent gradients. Each gradient has a length that is parallel to the second axis. Each gradient corresponds with a different one of the subunits and visually represents the minimum value and the maximum value.

DETAILED DESCRIPTION OF THE INVENTION

Figure 1:
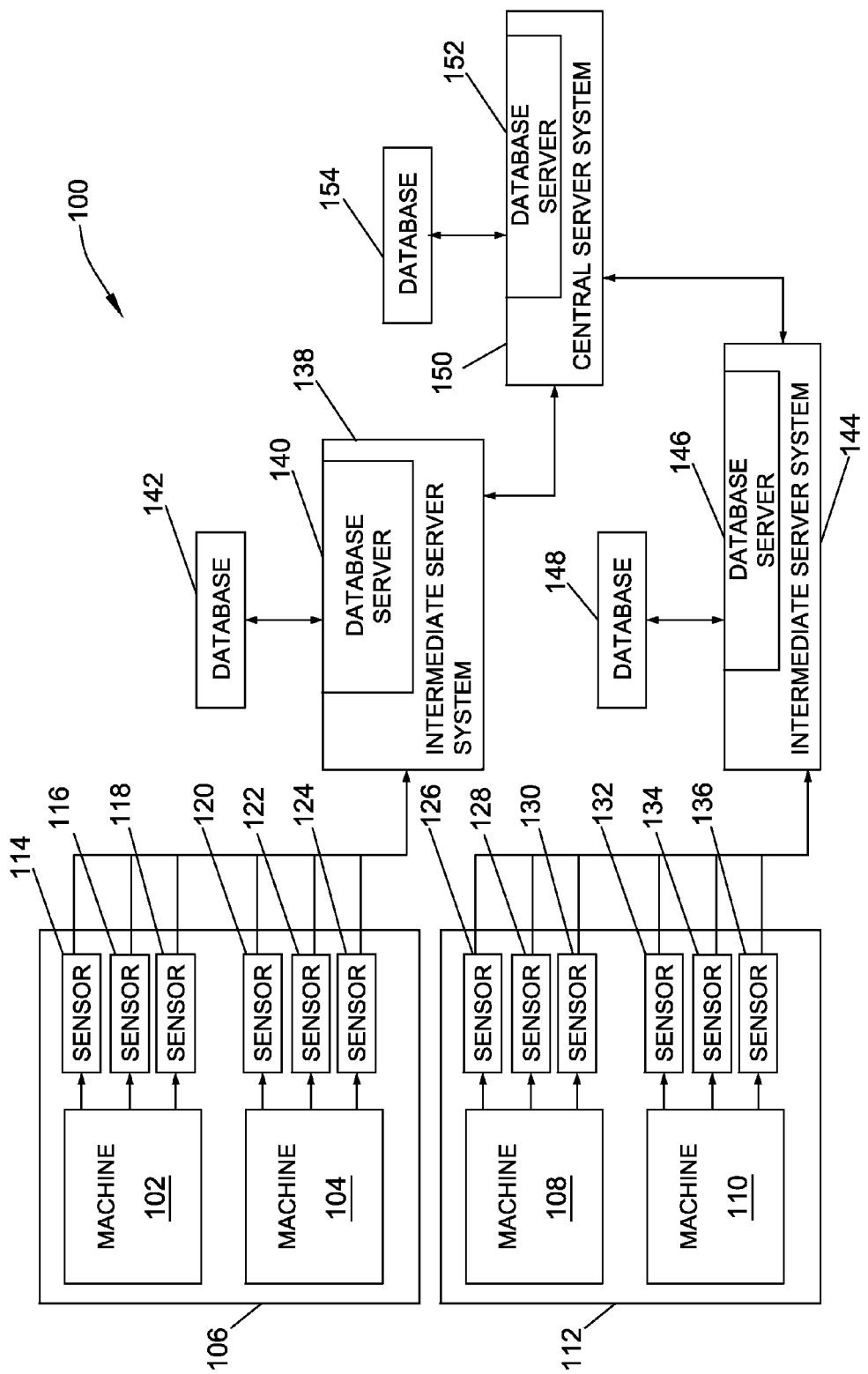
FIG. 1 is a block diagram of an exemplary system that may be used to collect information from multiple sensors from multiple machines.

FIG. 1 is a simplified block diagram of an exemplary system 100 for use in collecting information from multiple sensors 114, 116, 118, 120, 122, 124, 126, 128, 130, 132, 134, and 136 from multiple machines 102, 104, 108, and 110. In the exemplary embodiment, machines 102 and 104 are located in a facility 106. Likewise, machines 108 and 110 are located in a facility 112. Facilities 106 and 112 may be involved, for example, in the generation of electricity. For example, facilities 106 and 112, and more specifically, machines 102, 104, 108, and 110, may be used in converting a raw resource into electricity. In other embodiments, facilities 106 and 112 may instead be used in any other process involving multiple machines. In other embodiments, facilities 106 and 112 may be used in different processes. In yet other embodiments, there may be any number of facilities and/or machines.

Sensors 114, 116, and 118 are coupled to machine 102. In the exemplary embodiment, sensor 114 measures a temperature of machine 102, sensor 116 measures a vibration of machine 102, and sensor 118 measures a voltage of machine 102. Likewise, sensors 120, 122, and 124 are also communicatively coupled to machine 104. In the exemplary embodiment, sensor 120 measures a temperature of machine 104, sensor 122 measures a vibration of machine 104, and sensor 124 measures a voltage of machine 126. Sensors 126, 128, and 130 are communicatively coupled to machine 108. Specifically, in the exemplary embodiment, sensor 126 measures a temperature of machine 108, sensor 128 measures a vibration of machine 108, and sensor 130 measures a voltage of machine 108. Additionally, sensors 132, 134, and 136 are also coupled to machine 110 to enable sensor 132 to measure a temperature of machine 110, sensor 134 to measure a vibration of machine 110, and sensor 136 to measure a voltage of machine 110. Sensors 114, 116, 118, 120, 122, 124, 126, 128, 130, 132, 134, and 136 perform a measurement on a periodic basis, for example every second, every tenth of a second, or any other length of time.

An intermediate server system 138 is communicatively coupled to sensors 114, 116, 118, 120, 122, and 124. Intermediate server system 138 includes a database server 140 that stores and retrieves information in database 142. Intermediate server system 138 receives measurement data from sensors 114, 116, 118, 120, 122, and 124 and causes database server 140 to store the received measurement data in database 142. Similarly, an intermediate server system 144 is communicatively coupled to sensors 126, 128, 130, 132, 134, and 136. Intermediate server system 144 includes a database server 146 that stores and retrieves information in a database 148. Intermediate server system 144 receives measurement data from sensors 126, 128, 130, 132, 134, and 136 and causes database server 146 to store the received measurement data in database 148.

A central server system 150 is coupled to intermediate server systems 138 and 144. Similar to intermediate server systems 138 and 144, central server system 150 includes a database server 152 that stores and retrieves information in a database 154. Central server system 150 transmits instructions to intermediate server systems 138 and 144 to provide measurement data stored in databases 142 and 148, respectively, for storage in database 154. In the exemplary embodiment, central server system 150 transmits instructions and receives the corresponding measurement data at regular intervals, for example, daily. In the exemplary embodiment, for efficiency, the transmissions from central server system 150 ensure that only measurement information that has been added or updated since the previous time the intermediate server systems 138 and 144 provided measurement information to central server system 150 are transmitted to central server system 150. After receiving the measurement information from intermediate server systems 138 and 144, central server system 150 causes database server 152 to store the received measurement information in database 154. Other embodiments may include a different number of sensors and/or sensors that may measure different characteristics or behaviors of one or more machines. Additionally, in alternative embodiments, there are no intermediate server systems and all sensors are coupled to a central server system. In yet other embodiments, all sensors are coupled to a single computing device.

Figure 2:
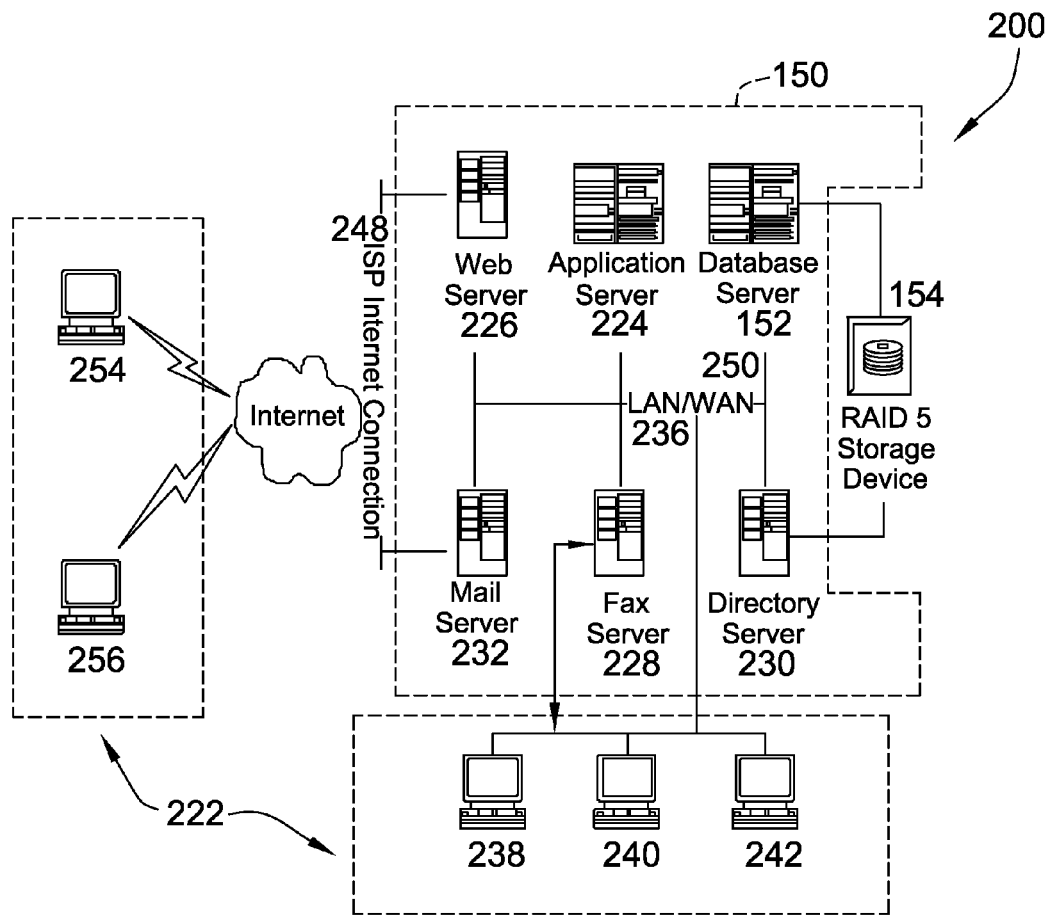
FIG. 2 is a block diagram of an exemplary system that may be used for displaying measurement information from at least one sensor of a machine.

FIG. 2 is a block diagram of an exemplary system 200 for use in displaying measurement information from at least one sensor (such as sensor 114) of a machine (such as machine 102). Components in system 200, identical to components of system 100 (shown in FIG. 1), are identified in FIG. 2 using the same reference numerals used in FIG. 1. It should be understood that system 100 and system 200 are two parts of a single system. System 200 includes central server system 150 and client systems 222. Central server system 150 also includes database server 152, an application server 224, a web server 226, a fax server 228, a directory server 230, and a mail server 232. A disk storage unit containing database 154 is coupled to database server 152 and to directory server 230. Servers 152, 224, 226, 228, 230, and 232 are communicatively coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 using an Internet link or are connected through an Intranet.

Each workstation, 238, 240, and 242, is a computing device that includes a web browser. Although the functions performed at the workstations are typically illustrated as being performed at respective workstations 238, 240, and 242, such functions can be performed at one of many computing devices coupled to LAN 236. Workstations 238, 240, and 242 are illustrated as being associated with separate functions only to facilitate an understanding of the different types of functions that can be performed by individuals having access to LAN 236.

Central server system 150 is configured to be communicatively coupled to entities outside LAN 236 as well, such as workstations 254 and 256 via an Internet connection 426. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 250, local area network 236 could be used in place of WAN 250.

In the exemplary embodiment, any authorized individual or entity having a workstation 238, 240, 242, 254, 256 may access system 200. At least one of the client systems includes a manager workstation 256 located at a remote location. Workstations 254 and 256 include a computing device having a web browser. Also, workstations 254 and 256 are configured to communicate with server system 150. Furthermore, fax server 228 is configured to communicate with remotely located client systems 222 using a telephone link.

Figure 3:
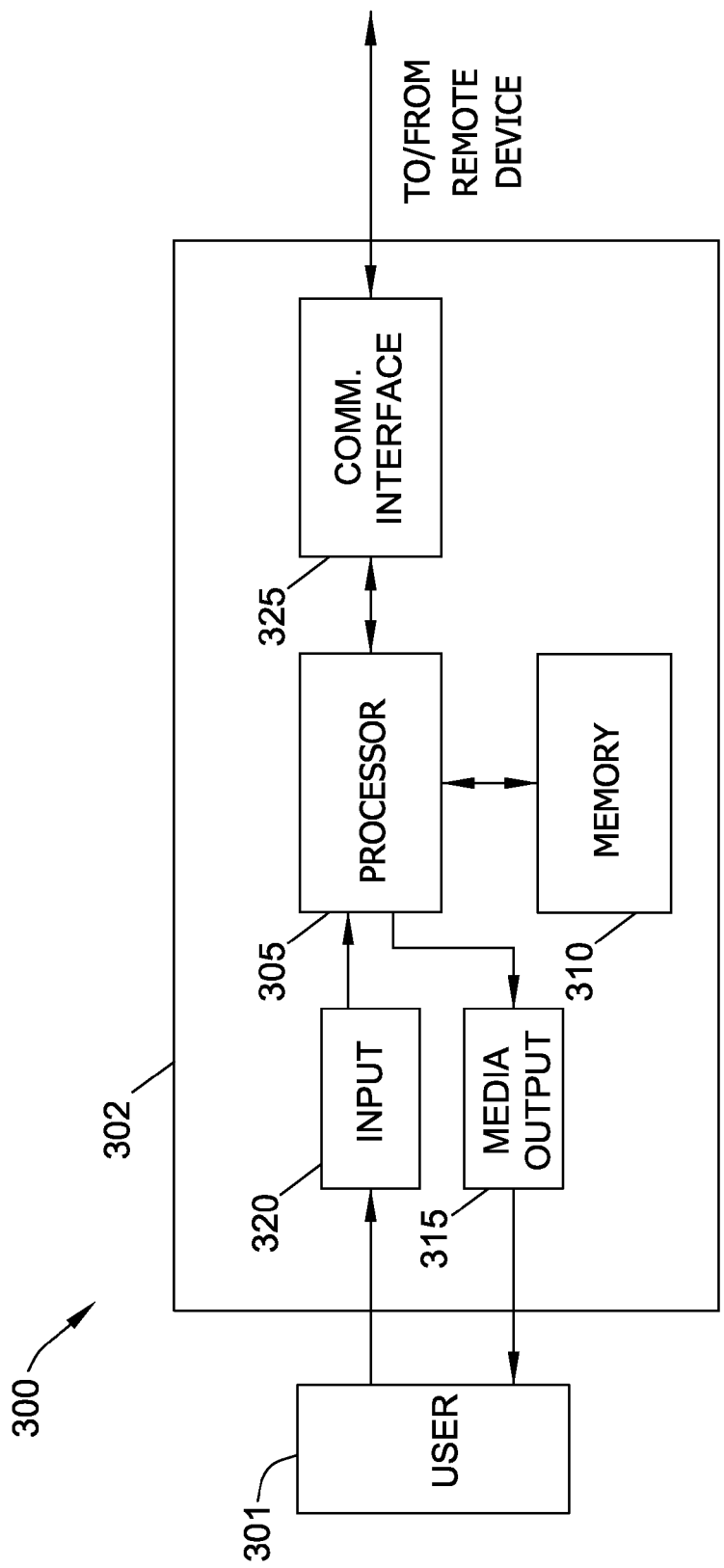
FIG. 3 illustrates an exemplary computing device that may be used with the system shown in FIG. 2.

FIG. 3 illustrates an exemplary computing device 302 that may be used with system 100 and/or system 200. For example, computing device 302 is representative of intermediate server 138, intermediate server 144, any servers 152, 224, 226, 228, 230, 232, of central server system 150, and/or client systems 222. Computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer readable media.

Computing device 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 315.

In some embodiments, computing device 302 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Computing device 302 may also include a communication interface 325, which is communicatively couplable to a remote computing device such as a server system 138, 144, 150 or a client system 222. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, processor-executable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from a server system, for example central server system 150. A client application allows a user, such as user 301, to display and interact with a server system, such as central server system 150, in a manner that does not necessarily involve a web page or website and which may offload more storage and/or processing functions to the client application from the server system.

Memory area 310 may include, but is not limited to, any computer-operated hardware suitable for storing and/or retrieving processor-executable instructions and/or data. Memory area 310 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 310 may include multiple storage units such as hard disks or solid state disks in a redundant array of inexpensive disks (RAID) configuration. Memory area 310 may include a storage area network (SAN) and/or a network attached storage (NAS) system. In some embodiments, memory area 310 includes memory that is integrated in computing device 302. For example, computing device 302 may include one or more hard disk drives as memory 310. Memory area 310 may also include memory that is external to computing device 302 and may be accessed by a plurality of computing devices 302. The above memory types are exemplary only, and are thus not limiting as to the types of memory usable for storage of a processor-executable instructions and/or data.

Figure 4:
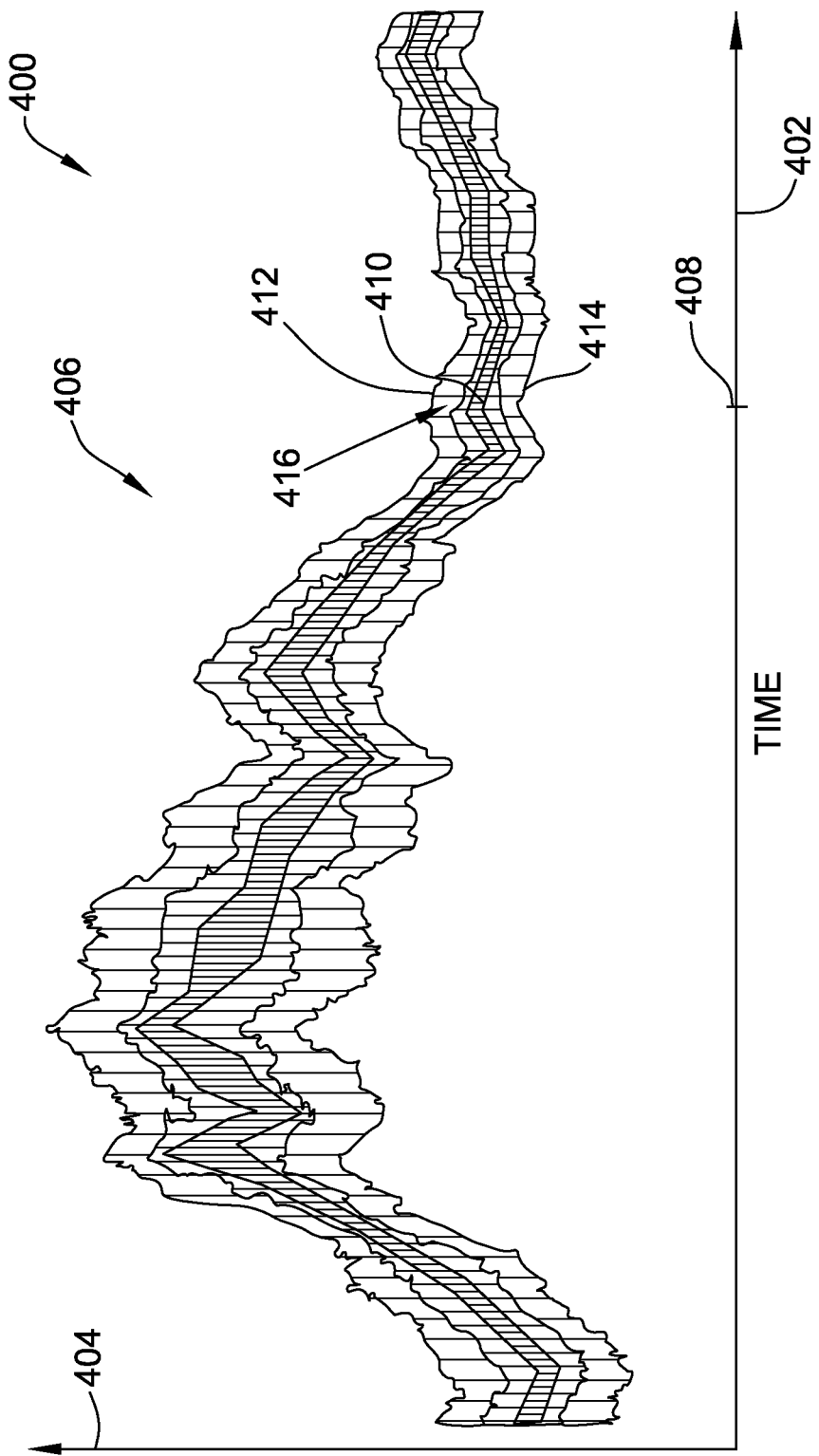
FIG. 4 is an exemplary plot that may be generated using the system shown in FIG. 2.

FIG. 4 is a plot 400 that may be generated using system 200 (shown in FIG. 2). Plot 400 may be displayed using a display device of media output component 315 (shown in FIG. 3). Plot 400 includes a first axis 402, and a second axis 404, perpendicular to first axis 402. In plot 400, first axis 402 corresponds to time. Second axis 404 corresponds to measurements from a sensor, such as sensor 116 (shown in FIG. 1). That is, in plot 400, the second axis corresponds to vibration information, such as an amplitude of vibration, for machine 102 (shown in FIG. 1). The information is measured by sensor 116 (shown in FIG. 1) and ultimately stored in database 154 (shown in FIG. 1). For any position along first axis 402, multiple data points, each being a vibration measurement, is represented. For example, within a one day time period, sensor 116 measures the vibration of machine 102 once every second (86,400 times per day). During the next day, sensor 116 again measures the vibration of machine 102 every second, and so on. First axis 402 represents a one-year time period. A trend 406 of the collected data is represented in plot 400. For each position or subunit along first axis 402, for example position 408, representing a particular second, a mean 410, a spread comprising a maximum value 412 and a minimum value 414, and a distribution represented by a gradient 416, is calculated by a computing device of system 200 and visually represented as shown in FIG. 4. That is, for position 408 along first axis 402, 365 data points or values are represented, each corresponding to a vibration measurement taken by sensor 116 at the same second in each day of the year.

Mean 410 is shown in black (or dark grey). In alternative embodiments, rather than representing a mean in black, one or more modes are shown in black. A maximum value 412 and a minimum value 414, represent the spread of the data points corresponding to position 408 along first axis 402. The maximum value 412 and minimum value 414 are light grey. Gradient 416 represents how the data points corresponding to position 408 are distributed. Again, position 408 corresponds to a specific second of each day during a year. That is, moving outwards in a direction parallel to second axis 404, the darkness of gradient 416 decreases from black to light grey. That is, the darkness of gradient 416 decreases, moving outward from mean 410 to maximum value 412 and minimum value 414. The rate of decrease in the darkness of each gradient 416 is in accordance with the distribution of the vibration measurements corresponding with position 408 of first axis 402. Accordingly, the darkness in each of gradient 416 may decrease, for example, linearly or exponentially. In the exemplary embodiment, adjacent gradients are blended together, to generate a continuous trend 406.

In alternative embodiments, rather than representing the data with levels of greyscale, the data is instead represented in a range of colors and/or levels of transparency. For example, the mean or mode may be represented with one end of a range of colors and/or transparency levels, and the maximum and minimum are represented using an opposite end of the range of colors and/or transparency levels. For example the maximum and minimum may be shown with full transparency and the mode or mean may be shown with no transparency. In other embodiments, statistical information including the mean, distribution, and one or modes may be calculated for other subunits of time, other than one-second subunits. Further, in alternative embodiments, first axis 402 represents a dimension other than time, such as frequency.

Figure 5:
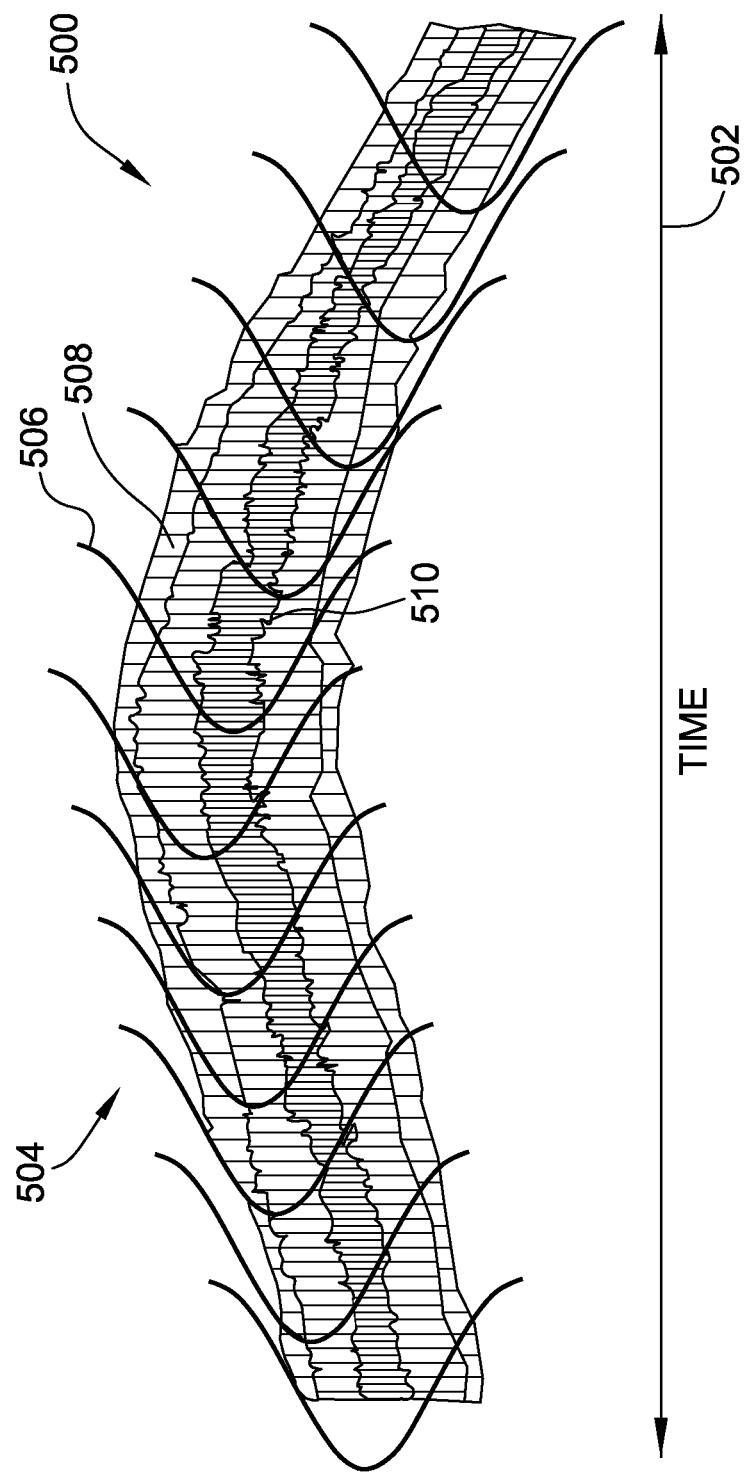
FIG. 5 is an exemplary plot that may be generated using the system shown in FIG. 2.

FIG. 5 is another plot 500 that may be generated using system 200 (shown in FIG. 2). For simplicity, only a first axis 502, representing time, is shown in FIG. 5. A plurality of distribution curves 504, for example distribution curve 506, are included to show how the darkness of the gradients, for example gradient 510, vary in accordance with the distribution of the underlying data being represented. Curves 504 are shown in FIG. 5 for explanatory purposes only, and, in the exemplary embodiment, would not actually be displayed to user 301 (shown in FIG. 3) through media output component 315 (shown in FIG. 3).

Figure 6:
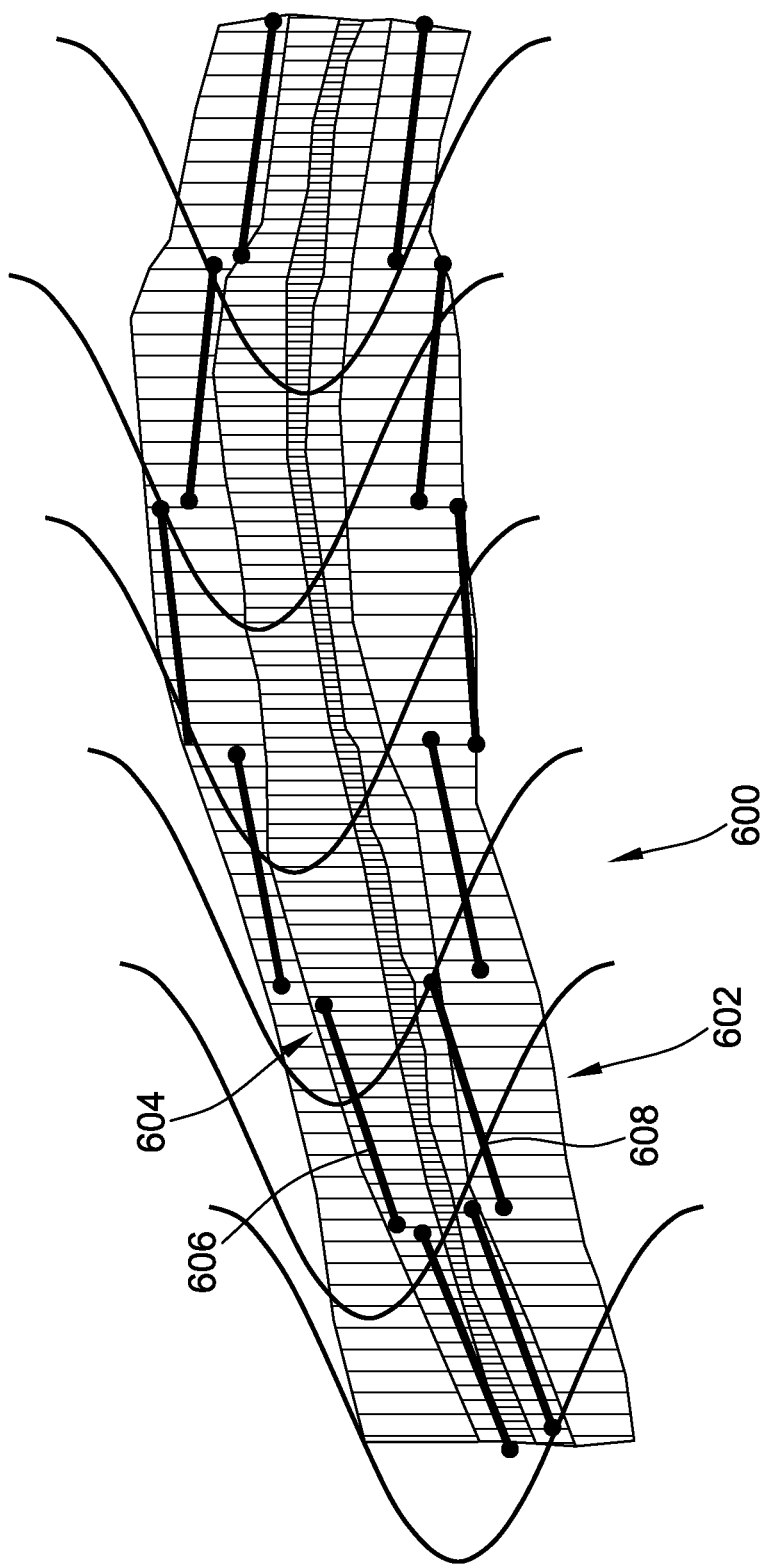
FIG. 6 is an exemplary plot that may be generated using the system shown in FIG. 2.

FIG. 6 is a plot 600 that may be generated using system 200 (shown in FIG. 2). A series of thresholds 602 are defined along trend 604. The series of thresholds 602 include a set of maximum thresholds, for example maximum threshold 606, and corresponding minimum thresholds, for example minimum threshold 608. The thresholds may be set by user 301 (shown in FIG. 3) through input device 320 (shown in FIG. 3), such as by drawing the maximum thresholds and minimum thresholds directly on plot 600 using a mouse, stylus, or the like. In alternative embodiments, media output component 315 (shown in FIG. 3) includes a touch screen, and user 301 (shown in FIG. 3) draws directly on the touchscreen of media output component 315 to define the maximum thresholds and minimum thresholds. In alternative embodiments, user 301 defines the thresholds numerically, in absolute terms. For example, user 301 may specify, using input device 320, that at time T, a vibration measurement from sensor 116 (shown in FIG. 1) should not exceed a maximum threshold of 20 or fall below a minimum threshold of 14. In other embodiments, user 301 may specify the maximum and minimum thresholds in relative terms, such as a number of standard deviations. In other embodiments, default thresholds are automatically set, and may be adjusted by user 301. For example, without information or instructions otherwise, system 200 may set default maximum thresholds and minimum thresholds at two standard deviations. The thresholds may be stored in memory area 310 (shown in FIG. 3), for example database 154 (shown in FIGS. 1 and 2), and retrieved for viewing and editing on an as-needed basis.

Thresholds 602 define optimal operating conditions for a machine. For example, if at time T, a vibration measurement from sensor 116 (shown in FIG. 1) exceeds 20, then machine 102 (shown in FIG. 1) may be malfunctioning. In order to optimize the performance of machine 102, system 100 (shown in FIG. 1) and/or system 200 (shown in FIG. 2), which are both parts of a larger system, may take a corrective action, such as initiating an alarm, generating and sending a notification to a user of machine 102, and/or shutting down machine 102.

Figure 7:
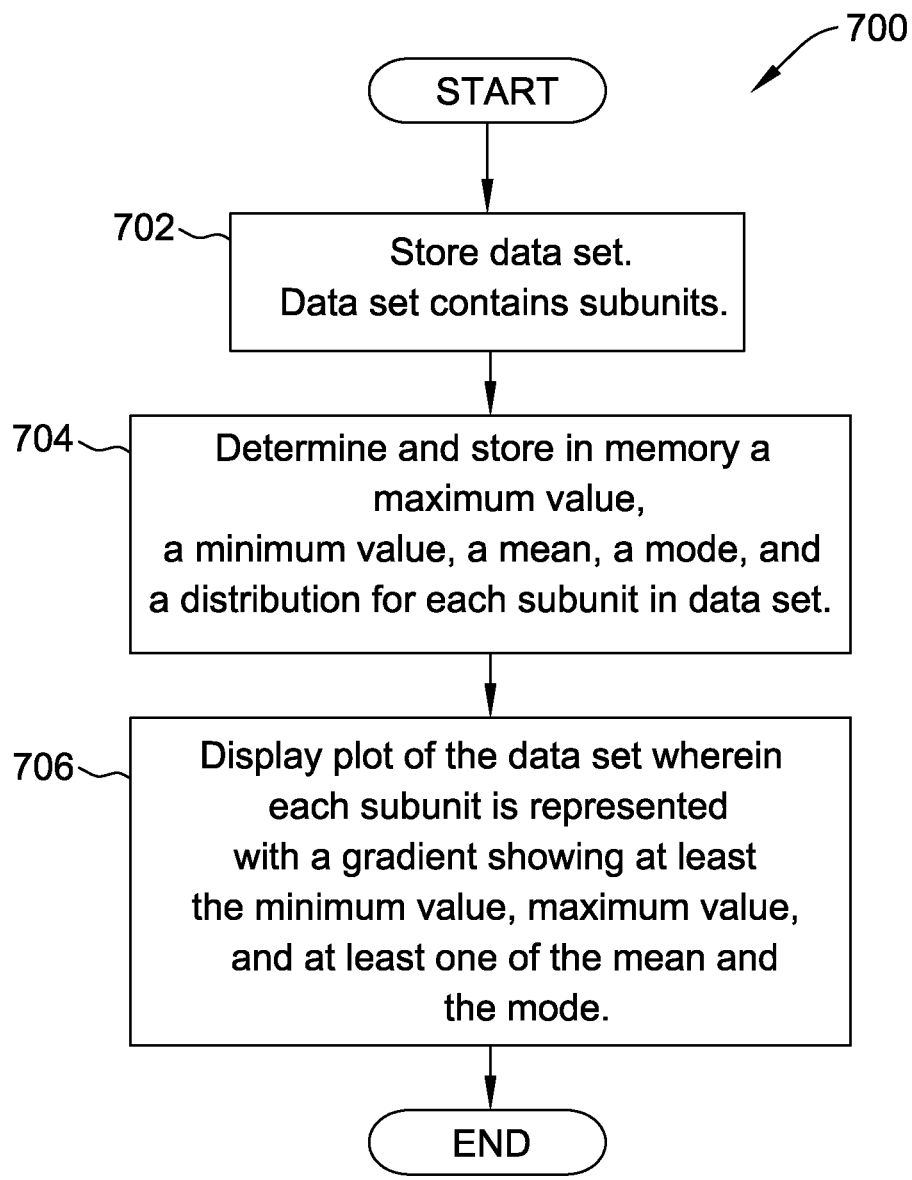
FIG. 7 is flowchart of an exemplary method that may be implemented to display measurement information from at least one sensor of a machine.

FIG. 7 is flowchart of an exemplary method 700 that may be implemented to display measurement information from at least one sensor of a machine. The method may be implemented by one or more computing devices 302 (shown in FIG. 3) as described above. At step 702, one or more computing devices 302 store a data set of sensor measurements. For example, the data set may be stored in memory area 310 (shown in FIG. 3), which may include database 154 (shown in FIGS. 1 and 2). As explained above, the data may include sensor measurements over a given length of time. Each subunit of the data set corresponds to each moment a sensor takes a measurement, for example each second. At step 704, one or more computing devices 302 determine, for each subunit, a maximum value, a minimum value, at least one of a mean and a mode, and a distribution of the values in the subunit. At step 706, one or more computing devices 302 generate and display a plot, for example plot 400 (shown in FIG. 4), of the data set and generate a gradient, for example gradient 416 (shown in FIG. 4), for each subunit.

As explained with reference to gradient 416 (shown in FIG. 4), the maximum value, the minimum value, at least one of a mean and a mode, and the distribution of the values of the data points in the subunit are represented by the gradient. In one embodiment, the steps of method 700 are carried out exclusively by central server system 150 (shown in FIG. 1) and the plot is displayed on a visual display local to central server system 150. In other embodiments, a computing device communicatively coupled to central server system 150, such as workstation 254 (shown in FIG. 2), receives the data set, stores it in memory area 310 (shown in FIG. 3), determines the maximum value, minimum value, at least one of the mean and a mode, and the distribution for each subunit in the data set using processor 305 (shown in FIG. 3), and displays the plot with media output 315 (shown in FIG. 3). In other embodiments, a portion of the steps of method 700 are carried out by central server system 150 and a second portion of the steps are carried out by a computing device communicatively coupled to central server system 150. For example, central server system 150 may carry out steps 702 and 704, then transmit the results to workstation 254 (shown in FIG. 2) to display a plot in accordance with step 706. In other embodiments, the method is carried out by a single computing device in accordance with FIG. 3, coupled to one or more sensors.

A technical effect of systems and methods described herein includes at least one of: (a) storing, in a memory coupled to a computing device, a data set based on measurement information from at least one sensor, the data set has a first dimension and a second dimension and a plurality of data points, each data point has a first value associated with the first dimension and a second value associated with the second dimension, the first dimension is divided into multiple subunits, the data set contains multiple data points for each subunit, each subunit includes a minimum value, a maximum value, a distribution, a mode, and a mean based on the associated data points; and (b) displaying, with a display device, a plot of the data set, the plot includes a first axis corresponding with the first dimension of the data set and a second axis, perpendicular to the first axis, corresponding with the second dimension of the data set, and a plurality of adjacent gradients, wherein each gradient has a length that is parallel to the second axis, each gradient corresponds with a different one of the subunits and visually represents the minimum value, the maximum value, the distribution, and at least one of the mean and the mode.

As compared to known methods and systems for use in plotting data, the methods and systems described herein clearly show how data pertaining to a particular type of measurement for a particular machine is distributed over repetitions of a time period. Accordingly, users reviewing, for example, collected sensor measurements in plots generated using systems and methods described herein will be able to easily see a trend with a maximum, a minimum, a mean or mode, and a distribution of collected measurements for any point in time in the repeated time period.

Exemplary embodiments of methods and systems for plotting a distribution of data are described above in detail. The methods and systems described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for displaying measurement information from at least one sensor of a machine, the method implemented by a computing device, the method comprising:
    storing, in a memory coupled to the computing device, a data set based on measurement information from the one sensor, the data set has a first dimension and a second dimension and a plurality of data points, each data point has a first value associated with the first dimension and a second value associated with the second dimension, the first dimension is divided into multiple subunits, the data set contains multiple data points for each subunit, each subunit includes a minimum value, a maximum value, a distribution, a mode, and a mean based on the associated data points; and
    displaying, with a display device, a plot of the data set, the plot includes a first axis corresponding with the first dimension of the data set and a second axis, perpendicular to the first axis, corresponding with the second dimension of the data set, and a plurality of adjacent gradients,
    wherein each gradient has a length that is parallel to the second axis, each gradient corresponds with a different one of the subunits and visually represents the minimum value and the maximum value, wherein each gradient comprises a variation of color, brightness, or transparency from the mode or the mean to the minimum and maximum values.

2. The method of claim 1, comprising calculating, with the computing device, at least one of the mean and the mode for each subunit and wherein each gradient additionally visually represents the distribution and at least one of the mean and the mode.

3. The method of claim 1, comprising:
    displaying, in a light shade of grey, the minimum value and the maximum value of a subunit associated with a gradient; and
    displaying, in a dark shade of grey or black, the mode or the mean of the subunit associated with the gradient.

4. The method of claim 1, comprising:
    displaying, with a first visual characteristic, the minimum value and the maximum value of a subunit associated with a gradient; and
    displaying, with a second visual characteristic which is different than the first visual characteristic, the mode or the mean of the subunit associated with the gradient.

5. The method of claim 1, wherein storing the data set includes storing the data set such that the first dimension pertains to time; and
    displaying the plot of the data set includes displaying the plot such that the first axis pertains to time.

6. The method of claim 5, wherein storing the data set such that the first dimension pertains to time further includes storing the data set such that the first dimension pertains to a repeated period of time and each subset includes one data point for each repetition of the period of time; and
    displaying the plot such that the first axis pertains to time further includes displaying the plot such that the first axis pertains to the repeated period of time.

7. The method of claim 1, comprising displaying, with the display device, at least one threshold in the plot, the threshold represents a predefined minimum optimal operating condition for the machine.

8. The method of claim 1, wherein the computing device further includes an input device, and the method further comprises:
    receiving input through the input device to define at least one threshold representing a minimum optimal operating condition for the machine; and
    storing the threshold in the memory.

9. The method of claim 8, comprising:
    receiving input through the input device to information defining at least one corrective action to be taken if the at least one threshold is exceeded; and
    storing the information defining the at least one corrective action in the memory.

10. The method of claim 8, comprising defining the threshold as a number of standard deviations.

11. A computing device for displaying measurement information from at least one sensor of a machine, the computing device comprises a processor, a memory coupled to the processor, and a display device coupled to the processor, the memory contains processor-executable instructions for performing the steps of:
    storing, in the memory, a data set based on measurement information from the one sensor, the data set has a first dimension and a second dimension and a plurality of data points, each data point has a first value associated with the first dimension and a second value associated with the second dimension, the first dimension is divided into multiple subunits, the data set contains multiple data points for each subunit, each subunit includes a minimum value, a maximum value, a distribution, a mode, and a mean based on the associated data points; and
    displaying, with the display device, a plot of the data set, the plot includes a first axis corresponding with the first dimension of the data set and a second axis, perpendicular to the first axis, corresponding with the second dimension of the data set, and a plurality of adjacent gradients,
    wherein each gradient has a length that is parallel to the second axis, each gradient corresponds with a different one of the subunits and visually represents the minimum value and the maximum value, wherein each gradient comprises a variation of color, brightness, or transparency from the mode or the mean to the minimum and maximum values.

12. The computing device of claim 11, wherein the memory further contains processor-executable instructions for performing the step of:
    calculating at least one of the mean and the mode for each subunit,
    and wherein each gradient additionally visually represents the distribution and at least one of the mean and the mode.

13. The computing device of claim 11, wherein the memory further contains processor-executable instructions for performing the step of:
    displaying, in a light shade of grey, the minimum value and the maximum value of a subunit associated with a gradient; and
    displaying, in a dark shade of grey or black, the mode or the mean of the subunit associated with the gradient.

14. The computing device of claim 11, wherein the memory further contains processor-executable instructions for performing the step of:

displaying, with a first visual characteristic, the minimum value and the maximum value of a subunit associated with a gradient; and displaying, with a second visual characteristic which is different from the first visual characteristic, the mode or the mean of the subunit associated with the gradient.

15. The computing device of claim 11, wherein the memory further contains processor-executable instructions such that:

storing the data set includes storing the data set such that the first dimension pertains to time; and displaying the plot of the data set includes displaying the plot such that the first axis pertains to time.

16. The computing device of claim 15, wherein the memory further contains processor-executable instructions such that:

storing the data set such that the first dimension pertains to time further includes storing the data set such that the first dimension pertains to a repeated period of time and each subset includes one data point for each repetition of the period of time; and displaying the plot such that the first axis pertains to time further includes displaying the plot such that the first axis pertains to the repeated period of time.

17. The computing device of claim 11, wherein the memory further contains processor-executable instructions for performing the step of:

displaying, with the display device, at least one threshold in the plot, the threshold represents a predefined minimum optimal operating condition for the machine.

18. The computing device of claim 11, wherein the computing device further includes an input device coupled to the processor, and the memory further contains processor-executable instructions for performing the steps of:

receiving input through the input device to define at least one threshold representing a minimum optimal operating condition for the machine; and storing the threshold in the memory.

19. The computing device of claim 18, wherein the memory further includes processor-executable instructions for performing the steps of:

receiving input through the input device to information defining at least one corrective action to be taken if the at least one threshold is exceeded; and storing the information defining the at least one corrective action in the memory.

20. A system for displaying measurement information from at least one sensor of a machine, the system comprising the machine, the at least one sensor, a computing device including a processor, a memory coupled to the processor, and a display device coupled to the processor, the memory contains processor-executable instructions for performing the steps of:

storing, in the memory, a data set based on measurement information from the one sensor, the data set has a first dimension and a second dimension and a plurality of data points, each data point has a first value associated with the first dimension and a second value associated with the second dimension, the first dimension is divided into multiple subunits, the data set contains multiple data points for each subunit, each subunit includes a minimum value, a maximum value, a distribution, a mode, and a mean based on the associated data points; and displaying, with the display device, a plot of the data set, the plot includes a first axis corresponding with the first dimension of the data set and a second axis, perpendicular to the first axis, corresponding with the second dimension of the data set, and a plurality of adjacent gradients, wherein each gradient has a length that is parallel to the second axis, each gradient corresponds with a different one of the subunits and visually represents the minimum value and the maximum value, wherein each gradient comprises a variation of color, brightness, or transparency from the mode or the mean to the minimum and maximum values.

* * * * *